(12) United States Patent
Hancock et al.

(10) Patent No.: US 12,506,163 B2
(45) Date of Patent: Dec. 23, 2025

(54) FUEL CELL SYSTEM WITH IMPROVED SEPARATION BETWEEN COOLANT MEDIA AND HYDROGEN

(71) Applicant: Airbus Operations GmbH, Hamburg (DE)

(72) Inventors: Kurtus Hancock, Hamburg (DE); Nikolaus Soukup, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 746 days.

(21) Appl. No.: 17/948,398

(22) Filed: Sep. 20, 2022

(65) Prior Publication Data
US 2023/0115104 A1  Apr. 13, 2023

(30) Foreign Application Priority Data
Sep. 24, 2021  (EP) .................................. 21198725

(51) Int. Cl.
*H01M 8/04029* (2016.01)
*H01M 8/04007* (2016.01)
*H01M 8/04089* (2016.01)

(52) U.S. Cl.
CPC ... *H01M 8/04029* (2013.01); *H01M 8/04067* (2013.01); *H01M 8/04097* (2013.01); *H01M 2250/20* (2013.01)

(58) Field of Classification Search
None
See application file for complete search history.

(56) References Cited

U.S. PATENT DOCUMENTS

| 2007/0148503 | A1  | 6/2007 | Okazaki |
| 2008/0050628 | A1* | 2/2008 | Lee ................... H01M 8/04029 429/437 |
| 2014/0205925 | A1* | 7/2014 | Baur ................. H01M 8/04007 429/434 |
| 2017/0263969 | A1* | 9/2017 | Nara .................. H01M 8/2484 |

FOREIGN PATENT DOCUMENTS

| DE | 102008050987 A1 |   | 4/2010 |
| JP | 2009009762 A    | * | 1/2009 |
| JP | 2009038015 A    |   | 2/2009 |

OTHER PUBLICATIONS

Extended Search Report for Application No. 21198725.0 dated Mar. 16, 2022. 5 pgs.

* cited by examiner

*Primary Examiner* — Alix E Eggerding
(74) *Attorney, Agent, or Firm* — Lerner David LLP

(57) ABSTRACT

A fuel cell system includes a fuel cell stack, a housing, a first coolant port, a second coolant port, and a cooling device having a coolant pump and a heat exchanger in fluid communication with the coolant pump. The housing includes an upper side and a bottom side. The fuel cell stack is arranged inside the housing. The first coolant port and the second coolant port each comprise a coolant tube having an inner tube, an outer tube and a gap therebetween. Each of the first coolant port and the second coolant port reach through the housing in a way that an inner end is further to the upper side than an outer end. The first coolant port and the second coolant port are coupled to the cooling device and a first coolant path of the fuel cell stack to form a coolant loop.

13 Claims, 2 Drawing Sheets

FUEL CELL SYSTEM WITH IMPROVED SEPARATION BETWEEN COOLANT MEDIA AND HYDROGEN

FIELD OF THE INVENTION

The invention relates to a fuel cell system and a vehicle having such a fuel cell system.

BACKGROUND OF THE INVENTION

Fuel cell systems for generating electrical power on board a vehicle are well known. In a fuel cell process, hydrogen supplied to an anode side and oxygen supplied to a cathode side are combined to form water, while an electrical current and heat are generated. For maintaining suitable operating conditions, the respective fuel cells are cooled through a cooling device. For example, the cooling device circulates a coolant, which absorbs heat in a cooling path of the fuel cell stack and discharges the heat through a heat exchanger.

BRIEF SUMMARY OF THE INVENTION

Liquid cooled fuel cell systems having a polymer electrolyte membrane (PEM) often use flammable or potentially flammable coolants, such as an ethylene glycol water mixture. As aerospace applications require additional safety considerations compared to ground-based vehicle or applications, it is an object of the invention to propose a fuel cell system that comprises an improved separation between a coolant media and hydrogen containing zones of the fuel cell system.

A fuel cell system is proposed, comprising a fuel cell stack, a housing, a first coolant port, a second coolant port, and a cooling device having a coolant pump and a heat exchanger in fluid communication with the coolant pump, wherein the housing comprises an upper side and a bottom side, wherein the fuel cell stack is arranged inside the housing, wherein the first coolant port and the second coolant port each comprise a coolant tube having an inner tube, an outer tube and a gap between the inner tube and the outer tube, wherein each of the first coolant port and the second coolant port reach through the housing in an inclined way such that an inner end is further to the upper side than an outer end, and wherein the first coolant port and the second coolant port are coupled to the cooling device and a first coolant path of the fuel cell stack to form a coolant loop.

The fuel cell stack may comprise an arrangement of individual fuel cells, which are electrically connected to each other, such as in a serial connection. By providing a suitable number of individual fuel cells and providing a suitable interconnection, a desired voltage level and electrical current can be reached. It is also conceivable that a plurality of groups of fuel cells is provided, wherein the groups are connected in series and/or parallel to achieve a desired current and voltage and the desired maximum power.

The individual fuel cells may be realized as polymer electrolyte membrane fuel cells, which comprise an arrangement consisting of an anode, a membrane, and a cathode. An operating temperature of such a PEM fuel cell may usually be in the range of 50 to about 80° C. or 90° C. High temperature PEM fuel cells exist with a higher operation temperature. The fuel cell stack may be provided in the form of a stack of bipolar plates and membranes arranged in between, such that a serial connection of a plurality of individual PEM fuel cells is created. It is clear that the bipolar plates comprise a flow field on each of their sides for the distribution of hydrogen, oxygen or air and water or water vapor. The bipolar plates may comprise an internal coolant distribution flow field for achieving the cooling function inside the fuel cell stack.

The housing is to be interpreted as an enclosure that surrounds at least the fuel cell stack. It defines a hydrogen containing space or envelope, as hydrogen may only be present in the direct vicinity of a fuel cell stack. Providing the housing to surround the fuel cell stack limits the hydrogen containing atmosphere to a distinct space.

The first and second coolant ports provide a connection of the fuel cell stack with the inflowing, chilled coolant and the outflowing, heated coolant. Thus, both coolant ports extend from outside the housing into the interior space of the housing to the fuel cell stack. Since the inner ends are arranged further to the upper side of the housing, coolant follows the inclination and flows through the gap between the inner tube and the outer tube downwards, merely driven by gravity. Hence, if the housing is arranged in the dedicated orientation, leaking coolant may always flow out of the housing. Thus, a very simple, yet effective way of separating the coolant from the hydrogen-containing atmosphere inside the housing.

The coolant pump and the heat exchanger may be arranged outside the housing. Thus, the majority of coolant containing components is outside the housing. The risk of coolant leaking into the housing is further reduced. It is conceivable that a distance between the fuel cell stack and an adjacent wall, through which one of the coolant ports reach, is as small as possible. Thus, a section of each of the coolant ports inside the housing is as short as possible to further reduce the risk of leaking coolant into the housing.

The first coolant port may be arranged downstream the coolant pump, wherein the inner tube of the first coolant port is in fluid communication with the coolant pump and connected to a first inlet of the first coolant path, and wherein the inner tube of the second coolant port is connected to a first outlet of the first coolant path and in fluid communication with the heat exchanger. It is conceivable that the first inlet and the first outlet are arranged as near as possible at a housing wall in order to reduce the length of the coolant path to the fuel cell stack. Both the inner tube and the outer tube are connected to the fuel cell stack, wherein the inner tube is dedicated for leading the coolant to the fuel cell stack.

The fuel cell system may further comprise a hydrogen recirculation pump in fluid communication with an anode outlet and an anode inlet of the fuel cell stack, wherein the hydrogen recirculation pump comprises a second coolant path having a second cooling inlet and a second coolant outlet, and wherein the second coolant inlet and the second coolant outlet are arranged in a bypass path of the coolant loop. The hydrogen recirculation pump may be arranged on or at a wall of the housing, wherein a pump heat exchanger is accessible on an outer side of the housing. For example, the pump may be arranged inside the housing directly on a side wall. The pump heat exchanger having a second coolant path may be arranged on the outer side of the respective wall, wherein the pump and the pump heat exchanger are thermally coupled. Material of the pump heat exchanger, a pump housing, mounting surfaces and/or at least a local section of the housing may be selected to have a good thermal conductivity, such as copper, aluminium, or magnesium. Also, a distance between heat producing elements of the pump and the pump heat exchanger may be reduced as much as possible. This allows to further improve the separation of hydrogen and the coolant.

As stated above, it is conceivable that a section of the recirculation pump containing the second coolant path is arranged on the outer side of the housing, and a section of the recirculation pump being in contact with hydrogen is arranged inside the housing. The recirculation pump may comprise a multi-part pump housing, wherein one of the parts may comprise the second coolant path and is attached to an external surface of the housing, while the other parts of the pump housing may be attached inside the housing of the fuel cell system.

It is further conceivable that in the fuel cell system the housing may comprise a hydrogen discharge opening in or adjacent to the upper side. Hence, hydrogen that reaches an interior space of the housing is able to escape the housing through the discharge opening, as it is lighter than air.

Furthermore, in the fuel cell system at least one of the first coolant port, the second coolant port and coolant leading components of the coolant loop comprises a fire shield. The fire shield may include an additional layer of a suitable material that allows to increase a burn-through time. Hence, the fire shield protects the coolant pipe from a hydrogen flame for a given time frame. With this shield, the pipe is able to withstand a given time in a hydrogen flame to prevent an additional leak of coolant fluid into the hydrogen containing area.

For example, the fire shield may comprise a coating and/or an additional metal shield. The coating may be based on a flame retardant material based on a mineral, an organohalogen compound, an organophosphorus compound, an organic compound, a polymer composite, which may be filled with metal derivatives, and other. The metal shield may include foils or sheet metal made from steel, Molybdenum, Nickel, Platinum, Titanium, Tungsten or other. Providing metal compound nanoparticles, such as zinc oxide, zinc borate, magnesium hydroxide, and layered double hydroxides may also be used as effective flame retardants. The fire shield may preferably be arranged on the outer tubes.

Additionally, at least one hydrogen handling balance of plant component may be arranged inside the housing to supply hydrogen to the fuel cell stack. The balance of plant is understood as a number of auxiliary equipment items that allow the fuel cell system to operate. It may comprise the cooling device and coolant leading pipes and lines. Furthermore, it may comprise a hydrogen circuit configured to supply the fuel cell with hydrogen. If the fuel cell system is an air supplied fuel cell system, the balance of plant may also comprise an air circuit configured to supply the fuel cell with air. It is conceivable that as many hydrogen handling components as possible are arranged inside the housing. Thus, a further improved separation of hydrogen and coolant is realized.

The fuel cell system may further comprise at least one leakage sensor designed for detecting coolant, wherein the at least one leakage sensor is in communication with a signaling device for indicating a leakage, and wherein the at least one leakage sensor is in fluid communication with the gap of the first coolant port and/or the second coolant port. Thus, in case coolant reaches the gap between the tubes, the respective leakage sensor may detect the leakage and a warning signal may be sent to a warning device. This may include displaying a message on a screen, storing an entry into an electronic maintenance book, sending an electronic message to a workshop or a ground station, if an aircraft comprises the fuel cell system according to the invention.

The invention further relates to a vehicle comprising at least one electric consumer and at least one fuel cell system of the above description. The at least one electric consumer may be any kind of electric consumer. It is conceivable that the vehicle comprises at least one electric motor for providing thrust or conducting a certain function in, at or on the vehicle. The at least one electric consumer may also comprise lighting devices, galley devices, entertainment devices and other.

The vehicle may be an aircraft. The fuel cell system may exemplarily replace an auxiliary power unit and/or a generator and is connected to a main power bus inside the aircraft. It is also conceivable that the fuel cell system is dedicated for providing a somewhat isolated function, such as providing electric power to a galley or a group of galleys or a thrust unit.

The at least one fuel cell system may be arranged in a pressurized area of the aircraft. However, it is also conceivable that the at least one fuel cell system may also be arranged in an unpressurized area of the aircraft.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION

Figure 1A:
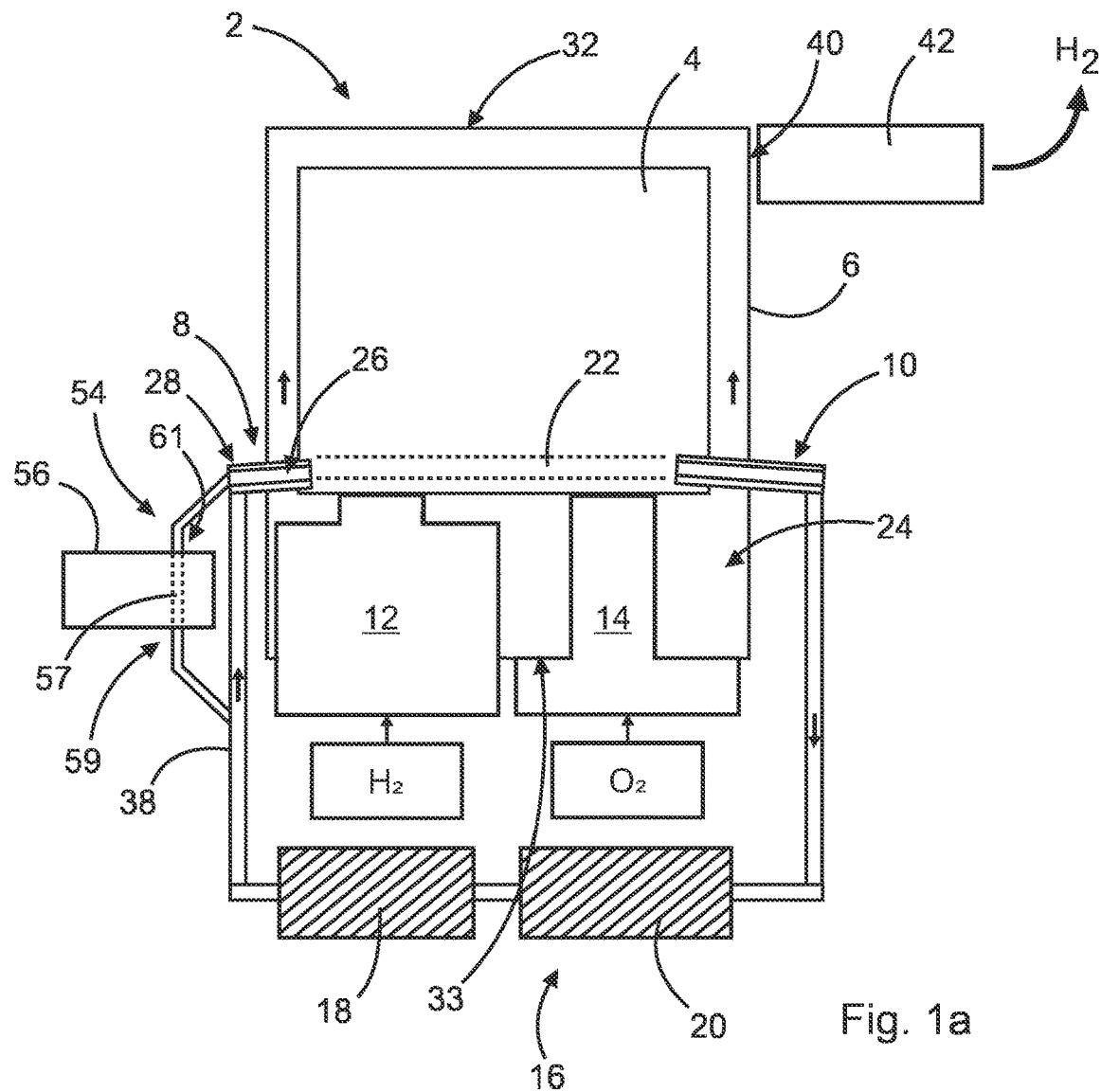
FIG. 1a, 1b a fuel cell system.

FIG. 1a shows a fuel cell system 2, comprising a fuel cell stack 4, a housing 6, a first coolant port 8 and a second coolant port 10. The fuel cell stack 4 comprises a plurality of individual fuel cells, which are not shown in detail herein. The fuel cell stack 4 is supplied with hydrogen from a hydrogen source 12 as well as air from an air source 14, which are connected to the fuel cell stack 4 and partially reach through the housing 6. A cooling device 16 is provided, which comprises a coolant pump 18 and a heat exchanger 20, which are coupled with the first coolant port 8 and the second coolant port 10. The coolant ports 8 and 10 are connected to a first coolant path 22 inside the fuel cell stack 4. Thus, a coolant loop is provided.

The housing 6 defines an interior space 24, in which a hydrogen enriched atmosphere may be present during the operation of the fuel cell stack 4. The hydrogen source 12 may comprise an arrangement of valves, supply lines, sensors etc., wherein as many hydrogen handling components as possible are arranged inside the interior space 24 to provide a separation between coolant and hydrogen.

Figure 1B:
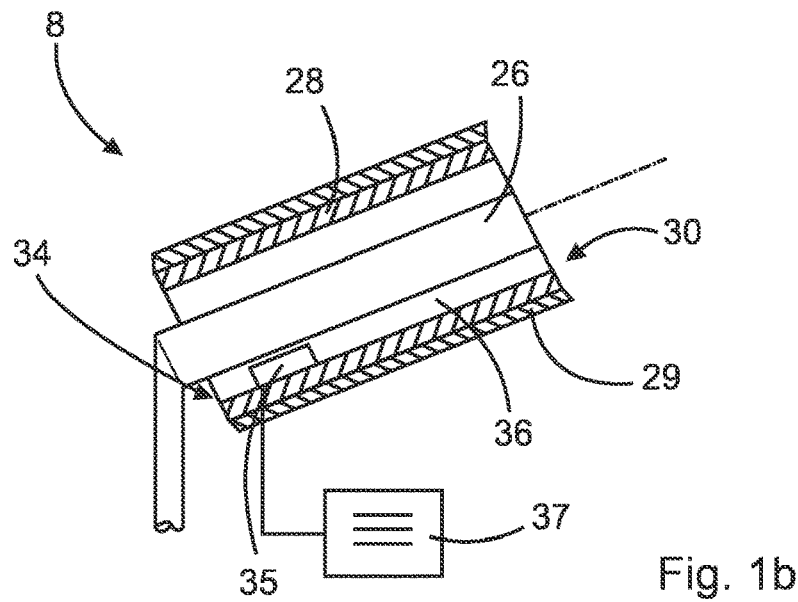

The first coolant port 8 is a double-walled pipe and has an inner tube 26 and an outer tube 28, which are shown in a magnified view in FIG. 1b. The inner tube 26 and the outer tube 28 are preferably arranged concentrically inside each other. The outer tube 29 exemplarily comprises a fire shield 29 in form of a metal foil. However, also a coating of a non-metallic material may be possible.

An inner end 30 of the first coolant port 8 is arranged further to an upper side 32 of the housing 6 than an outer end 34, wherein the upper side 32 is opposite to a bottom side 33. The same applies for the second coolant port 10. Hence, the first coolant port 8 and the second coolant port 10 are inclined, such that coolant, which reaches a gap 36 between the inner tube 26 and the outer tube 28 flows out of the housing 6 driven by gravity alone.

The inner tube 26 is connected to a coolant supply line 38, which is arranged downstream the coolant pump 18, which in turn is arranged downstream of and in fluid communication with the heat exchanger 20. The inner tube 26 of the second coolant port 10 is connected to the heat exchanger 20. Thus, the first coolant port 22 leads to heating up the coolant, which then flows through the heat exchanger 20 to dissipate heat. The coolant pump 18 pumps the chilled coolant with the coolant supply line 38 into the inner tube 26, which then reaches the first coolant path 22 again. This is conducted continuously, to provide a continuous cooling of the fuel cell stack 4.

At the upper side 32 of the housing 6, a hydrogen outlet 40 is provided. Here, a discharge pipe 42 may be arranged, which lets hydrogen flow out of the interior space 24 into the surrounding or to a further distanced location. As hydrogen is lighter than air, it automatically reaches the hydrogen outlet 40.

Figure 2:
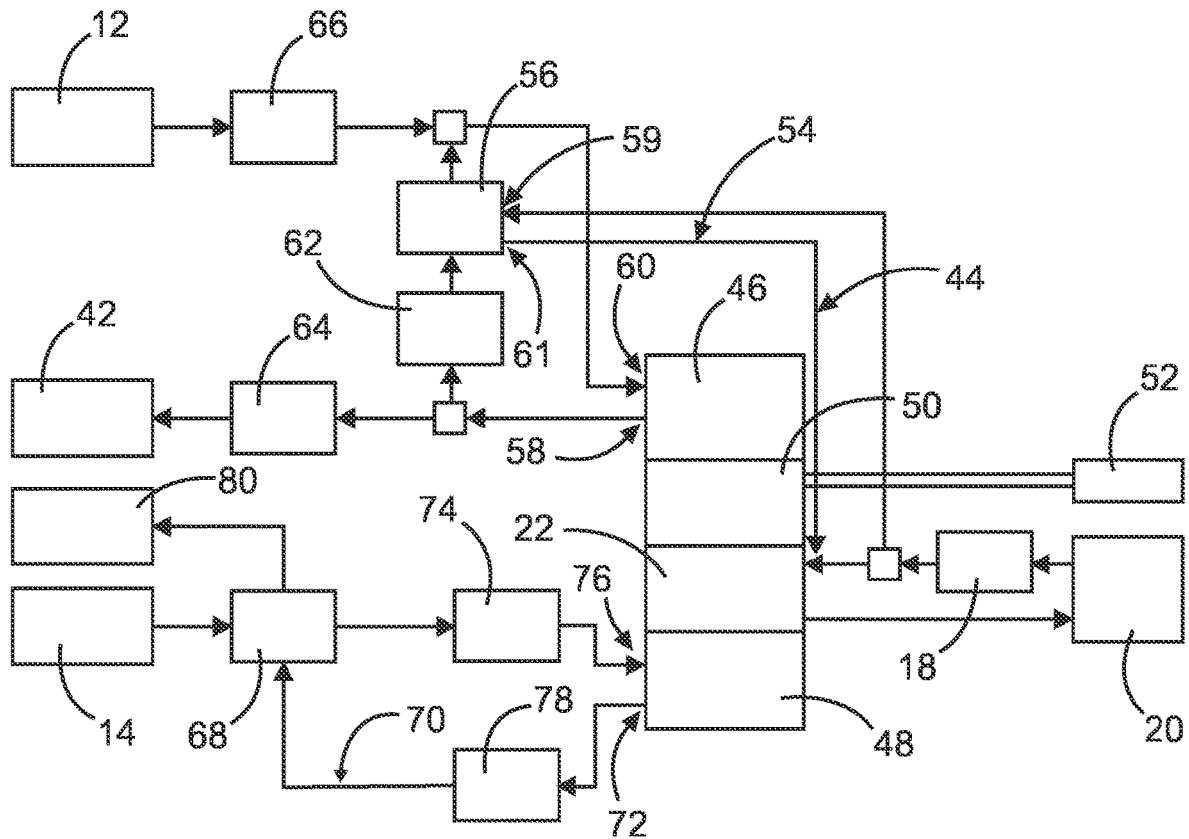
FIG. 2 the fuel cell system including peripheral components.

As also shown in FIG. 2, the fuel cell system 2 comprises a hydrogen recirculation pump 56, which has a second coolant path 57 having a second coolant inlet 59 and a second coolant outlet 61, wherein the second coolant path 57 is coupled with a bypass 54 of the coolant supply line 38. Thus, the hydrogen recirculation pump 56 can also be cooled through the coolant.

Exemplarily, a leakage sensor 35 is arranged in the gap 36 and coupled with a signaling device 37, which may be a screen for indicating a potential leakage to a user of the fuel cell system 2 or of another entity, in which the fuel cell system 2 is installed.

FIG. 2 shows the fuel cell system 2 in further detail. Here, a fuel cell 44 is shown very schematically in a block-oriented illustration. It comprises an anode 46, a cathode 48, the first cooling path 22 and an electric connection arrangement 50, which represents an electrical interface, i.e. connection terminals, to be connected with a power bus or rail. An electric consumer 52 is connected to the fuel cell 44 and is supplied with an electric current.

The first cooling path 22 is coupled with the coolant pump 18 and the heat exchanger 20. Between the first cooling path 22 and the coolant pump 18, a bypass 54 is arranged, which allows to cool a hydrogen recirculation pump 56. The hydrogen recirculation pump 56, in turn, allows to recirculate excess hydrogen from an anode outlet 58 back into a supply flow of hydrogen into an anode inlet 60. Upstream of the hydrogen recirculation pump 56, a water separator 62 is arranged, which is designed for removing water from anode exhaust gas. A purge valve 64 allows to actively purge the anode 46, wherein the purge valve 64 is coupled with the hydrogen outlet 40, i.e. the outlet pipe 42.

A hydrogen supply valve 66 is arranged downstream the hydrogen source 12 and allows to selectively supply hydrogen to the anode inlet 60. The cathode 48 receives air from the air supply 14, wherein a humidifier 68, humidifies the supplied air using humid cathode exhaust gas 70 from the cathode 72. The air supply can be interrupted through a first shut-off valve 74, which is arranged directly upstream of a cathode inlet 76. The cathode outlet 72 is directly coupled with a second shut-off valve 78. Excess exhaust is discharged through an exhaust outlet 80. It is conceivable that the housing 6 encloses the majority of the components related to hydrogen handling, such as the supply valve 66, the hydrogen recirculation pump 56, the water separator 62 and the purge valve 64.

Figure 3:
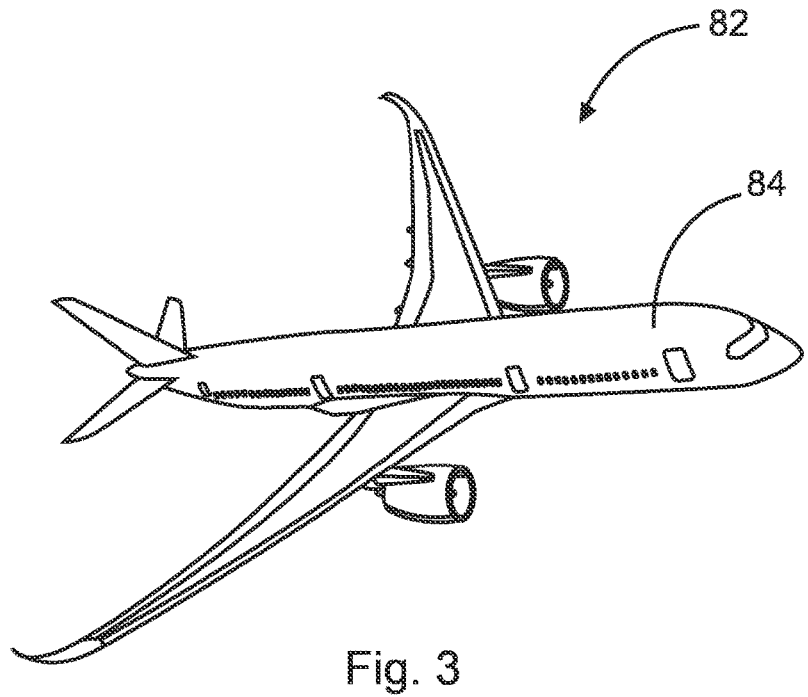
FIG. 3 an aircraft.

FIG. 3 shows an aircraft 82, which comprises a fuselage 84, which is pressurized. The fuel cell system 2 may be arranged inside the pressurized fuselage 84.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 fuel cell system
4 fuel cell stack
6 housing
8 first coolant port
10 second coolant port
12 hydrogen source
14 air source
16 cooling device
18 coolant pump
20 heat exchanger
22 first coolant path
24 interior space
26 inner tube
28 outer tube
30 inner end
32 upper side
33 bottom side
34 outer end
35 leakage sensor
36 gap
37 signaling device
38 coolant supply line
40 hydrogen outlet
42 discharge pipe
44 fuel cell
46 anode
48 cathode
50 electric connection arrangement
52 electric consumer
54 bypass
56 hydrogen recirculation pump
57 second coolant path
58 anode outlet
59 second coolant inlet
60 anode inlet
61 second coolant outlet
62 water separator
64 purge valve
66 hydrogen supply valve
68 humidifier
70 cathode exhaust gas
72 cathode outlet
74 first shut-off valve
76 cathode inlet
78 second shutoff-valve
80 exhaust outlet
82 aircraft
84 fuselage

The invention claimed is:

1. A fuel cell system, comprising:
   a fuel cell stack,
   a housing,
   a first coolant port,
   a second coolant port, and
   a cooling device having a coolant pump and a heat exchanger in fluid communication with the coolant pump,
   wherein the housing comprises an upper side and a bottom side,
   wherein the fuel cell stack is arranged inside the housing,
   wherein the first coolant port and the second coolant port each comprise a coolant tube having an inner tube, an outer tube and a gap between the inner tube and the outer tube,
   wherein each of the first coolant port and the second coolant port reach through the housing in an inclined way such that an inner end is further to the upper side than an outer end, and
   wherein the first coolant port and the second coolant port are coupled to the cooling device and a first coolant path of the fuel cell stack to form a coolant loop.

2. The fuel cell system of claim 1,
   wherein the coolant pump and the heat exchanger are arranged outside the housing.

3. The fuel cell system of claim 1,
   wherein the first coolant port is arranged downstream the coolant pump,
   wherein the inner tube of the first coolant port is in fluid communication with the coolant pump and connected to a first inlet of the first coolant path, and
   wherein the inner tube of the second coolant port is connected to a first outlet of the first coolant path and in fluid communication with the heat exchanger.

4. The fuel cell system of claim 1,
   further comprising a hydrogen recirculation pump in fluid communication with an anode outlet and an anode inlet of the fuel cell stack,
   wherein the hydrogen recirculation pump comprises a second coolant path having a second coolant inlet and a second coolant outlet, and
   wherein the second coolant inlet and the second coolant outlet are arranged in a bypass of the coolant loop.

5. The fuel cell system of claim 4,
   wherein a section of the recirculation pump containing the second coolant path is arranged on the outer side of the housing, and
   wherein a section of the recirculation pump in contact with hydrogen is arranged inside the housing.

6. The fuel cell system of claim 1,
   wherein the housing comprises a hydrogen discharge opening in or adjacent to the upper side.

7. The fuel cell system of claim 1,
   wherein at least one of the first coolant port, the second coolant port and coolant leading components of the coolant loop comprises a fire shield.

8. The fuel cell system of claim 7,
   wherein the fire shield comprises a coating and/or an additional metal shield.

9. The fuel cell system of claim 1,
   wherein at least one hydrogen handling balance of plant component is arranged inside the housing to supply hydrogen to the fuel cell stack.

10. The fuel cell system of claim 1,
    further comprising at least one leakage sensor configured for detecting coolant,
    wherein the at least one leakage sensor is in communication with a signaling device for indicating a leakage, and
    wherein the at least one leakage sensor is in fluid communication with the gap of the first coolant port and/or the second coolant port.

11. A vehicle comprising at least one electric consumer and at least one fuel cell system of claim 1.

12. The vehicle of claim 11, wherein the vehicle is an aircraft.

13. The vehicle of claim 12, wherein the at least one fuel cell system is arranged in a pressurized area of the aircraft.

* * * * *